United States Patent
Kameyama et al.

(10) Patent No.: US 12,111,052 B2
(45) Date of Patent: Oct. 8, 2024

(54) COOLING CHANNEL STRUCTURE, BURNER, AND HEAT EXCHANGER

(71) Applicant: MITSUBISHI HEAVY INDUSTRIES, LTD., Tokyo (JP)

(72) Inventors: Tatsuya Kameyama, Tokyo (JP); Taisei Ikemura, Tokyo (JP); Yasuaki Sugihara, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 361 days.

(21) Appl. No.: 17/626,973

(22) PCT Filed: Jan. 24, 2020

(86) PCT No.: PCT/JP2020/002556
§ 371 (c)(1),
(2) Date: Jan. 13, 2022

(87) PCT Pub. No.: WO2021/049054
PCT Pub. Date: Mar. 18, 2021

(65) Prior Publication Data
US 2022/0252257 A1      Aug. 11, 2022

(30) Foreign Application Priority Data
Sep. 13, 2019   (JP) ................................. 2019-166738

(51) Int. Cl.
*F23D 14/78*       (2006.01)
*F23D 11/36*       (2006.01)

(52) U.S. Cl.
CPC .............. *F23D 14/78* (2013.01); *F23D 11/36* (2013.01); *F23D 2214/00* (2013.01)

(58) Field of Classification Search
CPC ............ H02K 5/20; H02K 5/203; H02K 1/32; H02K 1/20; F23D 14/78; F23D 11/36; F23D 2214/00
(Continued)

(56) References Cited

U.S. PATENT DOCUMENTS 3,692,637 A * 9/1972 Dederra .................... F02K 9/64
                                                 29/DIG. 12
6,209,199 B1    4/2001 Cornu et al.
(Continued)

FOREIGN PATENT DOCUMENTS

| DE | 699 23 099 | 12/2005 |
| JP | 2015-206584 | 11/2015 |
| WO | 2014/105108 | 7/2014 |

OTHER PUBLICATIONS

International Search Report issued Mar. 31, 2020 in International (PCT) Application No. PCT/JP2020/002556.

*Primary Examiner* — Vivek K Shirsat
(74) *Attorney, Agent, or Firm* — Wenderoth, Lind & Ponack, L.L.P.

(57) ABSTRACT

A cooling channel structure including a first wall section extending along a first direction, a second wall section disposed at an interval from the first wall section in a second direction orthogonal to the first direction, and a plurality of partition wall sections connecting the first wall section and the second wall section so as to form at least one cooling channel between the first wall section and the second wall section. The cooling channel having a plurality of channel cross-sections disposed at intervals in the first direction. In a cross-section including the first direction and the second direction, the first wall section includes a thin portion having a thickness smaller than a thickness t1 of the first wall section at a position away from each of the partition wall sections in the first direction.

13 Claims, 9 Drawing Sheets

(58) Field of Classification Search
USPC .......... 431/160, 2; 310/54; 60/752, 267, 806
See application file for complete search history.

(56) References Cited

U.S. PATENT DOCUMENTS

| | | | |
|---|---|---|---|
| 8,661,827 B2* | 3/2014 | Morimoto | ............... F01D 9/023 29/463 |
| 2015/0107812 A1 | 4/2015 | Zanchetta et al. | |
| 2015/0285502 A1 | 10/2015 | DiCinto et al. | |

* cited by examiner

COOLING CHANNEL STRUCTURE, BURNER, AND HEAT EXCHANGER

TECHNICAL FIELD

The present disclosure relates to a cooling channel structure, a burner, and a heat exchanger.

BACKGROUND

Patent Document 1 discloses a fuel nozzle shroud which internally includes a cooling channel linearly extending along the axial direction. With the above configuration, by flowing a cooling medium to the cooling channel, it is possible to reduce a thermal stress caused in the fuel nozzle shroud.

CITATION LIST

Patent Literature

Patent Document 1: JP2015-206584A

SUMMARY

Technical Problem

Meanwhile, regarding a cooling channel for cooling an object to be cooled, if a plurality of channel cross-sections are disposed at intervals between two wall sections facing each other in a direction along wall surfaces, in the wall section of the above-described two wall sections exposed to a high-temperature fluid, a large thermal stress is caused at a connection position with a partition wall section partitioning the above-described plurality of channel cross-sections, which may cause damage. However, Patent Document 1 described above does not disclose any knowledge for the above problem and a solution thereto.

In view of the above, an object of the present disclosure is to provide a cooling channel structure, a burner, and a heat exchanger capable of suppressing damage caused by the thermal stress.

Solution to Problem

In order to achieve the above object, a cooling channel structure according to the present disclosure includes a first wall section extending along a first direction, a second wall section disposed at an interval from the first wall section in a second direction orthogonal to the first direction, and a plurality of partition wall sections connecting the first wall section and the second wall section so as to form at least one cooling channel between the first wall section and the second wall section, the cooling channel having a plurality of channel cross-sections disposed at intervals in the first direction. In a cross-section including the first direction and the second direction, letting t1 be a thickness of the first wall section at a position where a surface of the first wall section on a side of the second wall section and a front surface of each of the partition wall sections are connected, the first wall section includes a thin portion having a thickness smaller than the thickness t1 at a position away from each of the partition wall sections in the first direction.

In order to achieve the above object, another cooling channel structure according to the present disclosure includes a first wall section extending along a first direction, a second wall section disposed at an interval from the first wall section in a second direction orthogonal to the first direction, and a plurality of partition wall sections connecting the first wall section and the second wall section so as to form at least one cooling channel between the first wall section and the second wall section, the cooling channel having a plurality of channel cross-sections disposed at intervals in the first direction. The first wall section has a thickness smaller than a thickness of each of the partition wall sections.

Advantageous Effects

According to the present disclosure, provided are a cooling channel structure, a burner, and a heat exchanger capable of suppressing damage caused by a thermal stress.

DETAILED DESCRIPTION

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Figure 1:
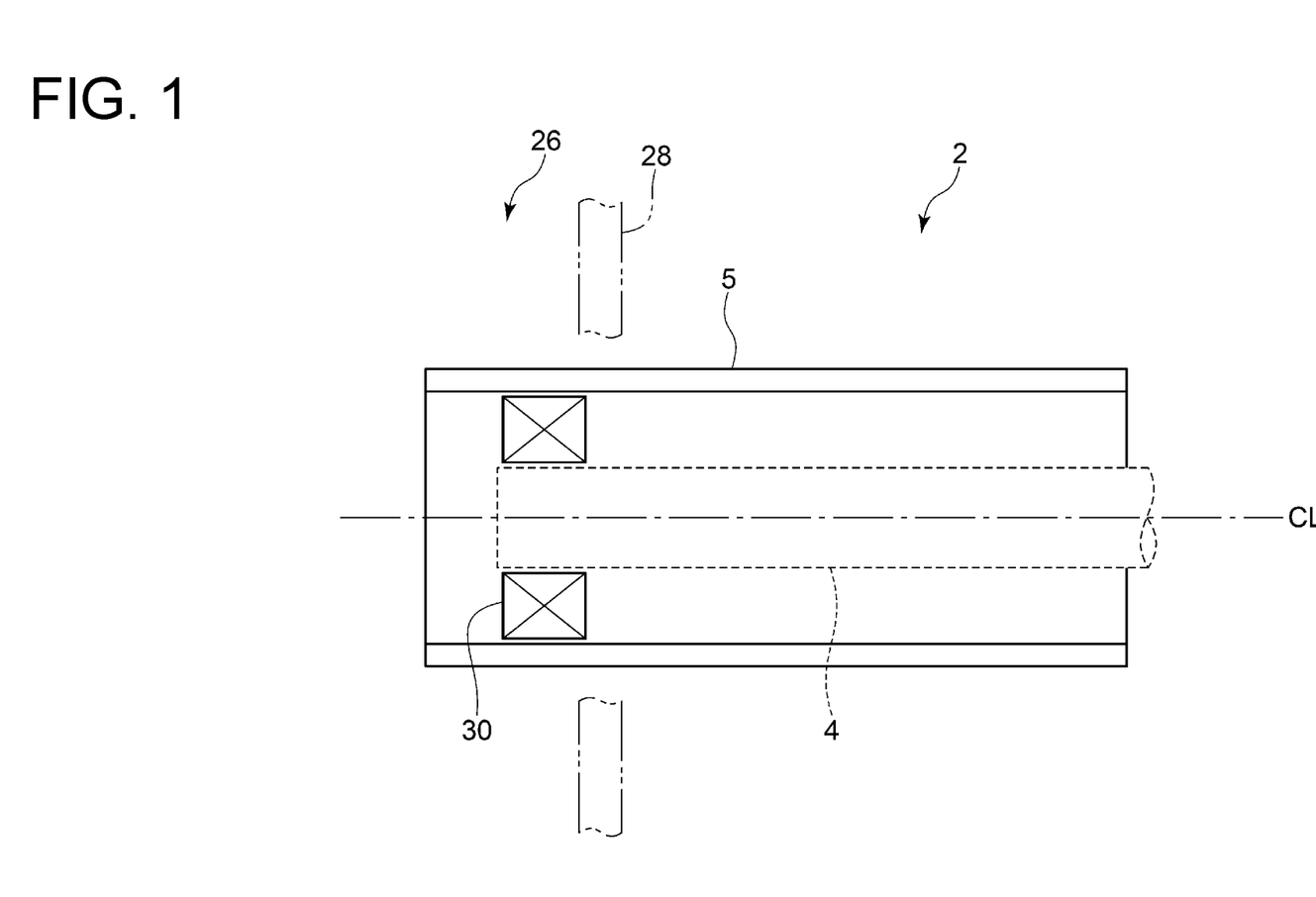
FIG. 1 is a vertical cross-sectional view showing the schematic configuration of a burner 2 according to an embodiment.

FIG. 1 is a vertical cross-sectional view showing the schematic configuration of a burner 2 according to an embodiment. The burner 2 is applied to, for example, a gasification furnace for a coal gasification device or the like, a conventional boiler, an incinerator, a gas turbine combustor, or an engine.

The burner 2 includes a fuel nozzle 4 for injecting fuel, and a burner tube 5 disposed around the fuel nozzle 4 on the same axis CL as the fuel nozzle 4, for guiding air serving as an oxidant for combusting the fuel. The burner tube 5 is a tubular member having openings at both ends, respectively, and functions as a shield tube for shielding heat. A swirler 30 is disposed between the outer peripheral surface of the fuel nozzle 4 and the inner peripheral surface of the burner tube 5. The burner tube 5 is disposed to penetrate a wall 28 of a combustion chamber 26 where flame is formed. The proximal end side of the burner tube 5 is located outside the combustion chamber 26, and the distal end side of the burner tube 5 is located inside the combustion chamber 26. On the proximal end side of the burner tube 5, for example, a flange or the like may be provided which is to be connected to an air supply pipe (not shown) for supplying air.

Hereinafter, the axial direction of the burner tube 5 will simply be referred to as the "axial direction", the radial direction of the burner tube 5 will simply be referred to as the "radial direction", and the circumferential direction of the burner tube 5 will simply be referred to as the "circumferential direction". Further, hereinafter, an inner portion of the burner tube 5 means a thick inner portion of the burner tube 5.

Figure 2:
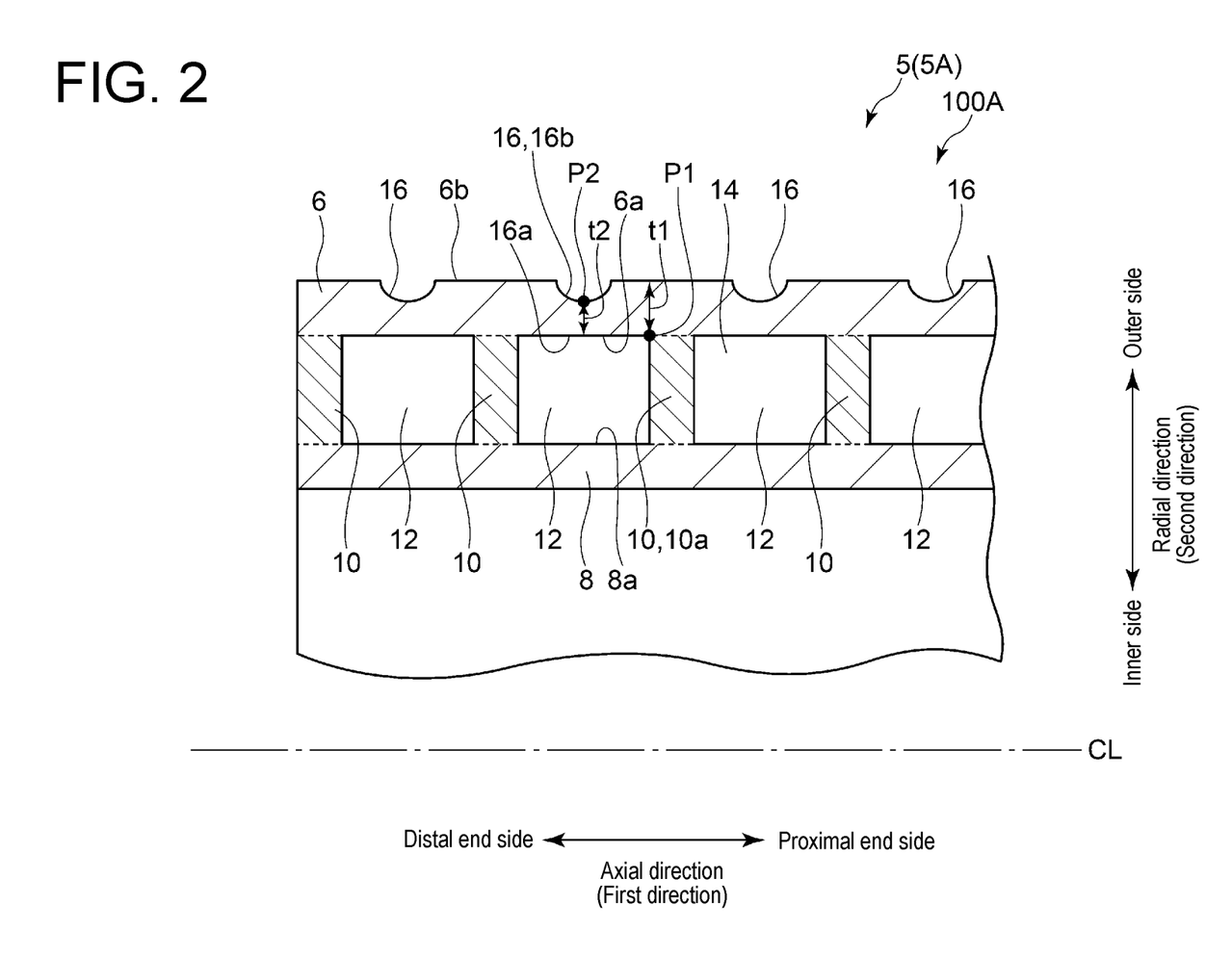
FIG. 2 is a vertical cross-sectional view showing the schematic configuration of a burner tube 5 (5A) according to an embodiment, and shows a cross-section including a center axis CL (a cross-section including the axial direction and the radial direction) of the burner tube 5 (5A).

Next, a configuration example of the burner tube 5 will be described with reference to FIG. 2. FIG. 2 is a vertical cross-sectional view showing the schematic configuration of a burner tube 5 (5A) according to an embodiment, and shows a cross-section including the center axis CL (a cross-section including the axial direction and the radial direction) of the burner tube 5 (5A).

As shown in FIG. 2, the burner tube 5 (5A) includes a tubular first wall section 6 extending along the axial direction serving as the first direction, a tubular second wall section 8 disposed at an interval from the first wall section 6 in the radial direction (a thickness direction of the burner tube 5) serving as the second direction orthogonal to the first direction, at least one cooling channel 14, and a plurality of partition wall sections 10 connecting the first wall section 6 and the second wall section 8. The tubular second wall section 8 is disposed on the inner peripheral side of the tubular first wall section 6, and the center axis CL of the first wall section 6 coincides with a center axis of the second wall section 8.

The plurality of partition wall sections 10 connect the first wall section 6 and the second wall section 8 so as to form the at least one cooling channel 14, which has a plurality of channel cross-sections 12 disposed at intervals in the axial direction, between the first wall section 6 and the second wall section 8. That is, each of the partition wall sections 10 is disposed in the cooling channel 14, extends from the first wall section 6 to the second wall section 8 along the radial direction, and forms a wall surface of the cooling channel 14. Each of the partition wall sections 10 has a radially outer end connected to a surface 6a of the first wall section 6 on the side of the second wall section 8 (the inner peripheral surface of the first wall section 6). Each of the partition wall sections 10 has a radially inner end connected to a surface 8a of the second wall section 8 on the side of the first wall section 6 (the outer peripheral surface of the second wall section 8). That is, the first wall section and the second wall section 8 are connected via the plurality of partition wall sections 10. A surface 6b of the first wall section 6 on a side opposite to the second wall section 8 faces a high-temperature fluid in the combustion chamber 26 (see FIG. 1). The at least one cooling channel 14 may be, for example, one spiral channel, a plurality of spiral channels, or one or a plurality of channels with various other shapes adopted for a heat exchanger and the like.

In the cross-section shown in FIG. 2, letting t1 be a thickness of the first wall section 6 at a position P1 where the surface 6a of the first wall section 6 on the side of the second wall section 8 and a front surface 10a (the front surface 10a along the radial direction in the illustrated cross-sectional form) of the partition wall section 10 are connected, the first wall section 6 includes a thin portion 16 having a thickness t2 smaller than the thickness t1 at a position P2 away from the partition wall section 10 in the axial direction. In the configuration shown in FIG. 2, the thin portion 16 has the thickness t2 smaller than the above-described thickness t1 at the position P2 where axial distances from the two partition wall sections 10 of the plurality of partition wall sections 10 adjacent to each other are equal. Further, a surface 16b of the thin portion 16 on the side opposite to the second wall section 8 (the outer peripheral surface of the thin portion 16) is formed into a concave shape to smoothly be curved, and the thin portion 16 has a minimum thickness at the above-described position P2. In the present specification, "the thickness is small" means "thin".

In the configuration shown in FIG. 2, the first wall section 6, the second wall section 8, and the plurality of partition wall sections 10 constitute a cooling channel structure 100A forming the at least one cooling channel 14. That is, the at least one cooling channel 14, through which a cooling medium for cooling the burner tube 5 (5A) flows, is formed in the inner portion of the burner tube 5 (5A) itself (the thick inner portion of the burner tube 5), and the burner tube 5 (5A) itself constitutes the cooling channel structure 100A. Such burner tube 5 (5A) can be produced by using, for example, a three-dimensional additive manufacturing device (so-called 3D printer). The cooling medium flowing through the cooling channel 14 may be, for example, a liquid such as water or oil, or a gas such as air.

Figure 3:
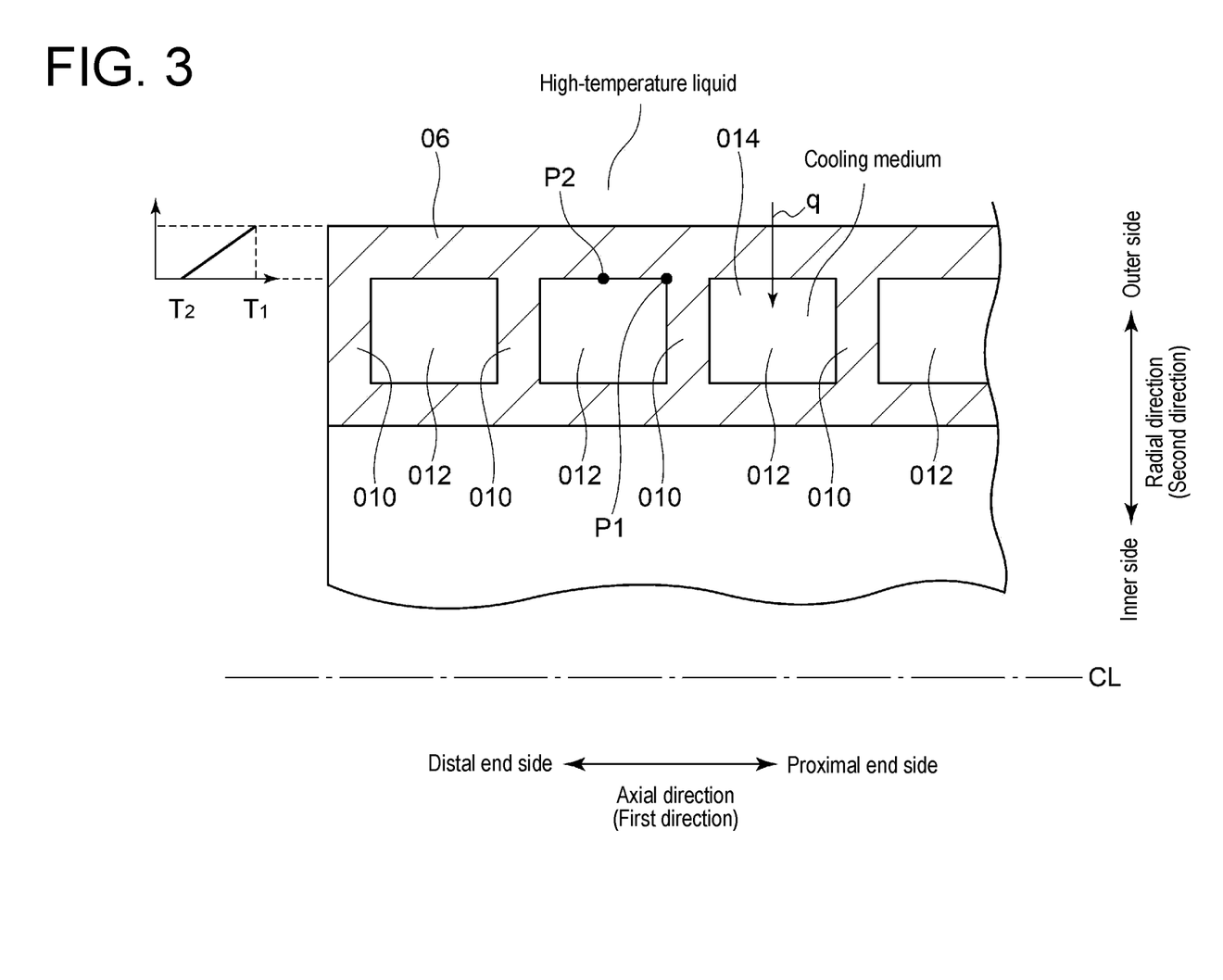
FIG. 3 is a vertical cross-sectional view showing the schematic configuration of the burner tube according to a comparative embodiment.
Figure 4:
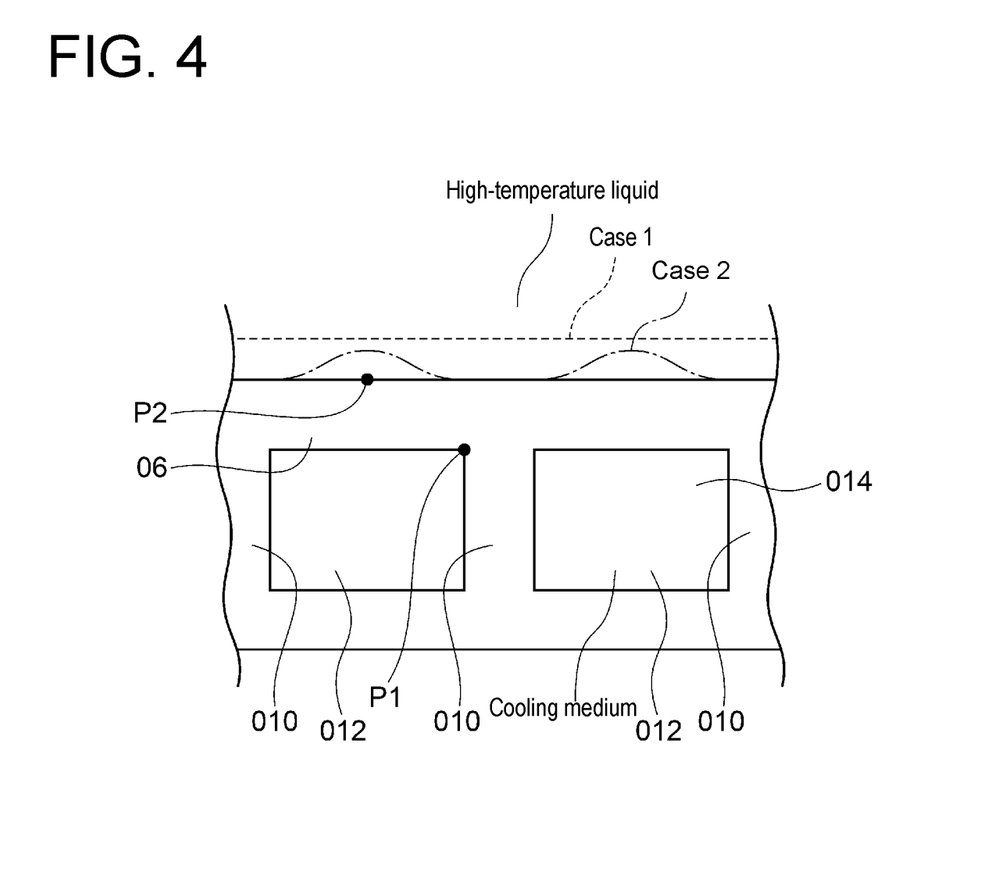
FIG. 4 is a partially enlarged view of the configuration shown in FIG. 3.

Herein, an effect obtained by the configuration shown in FIG. 2 will be described in contrast to comparative embodiments shown in FIGS. 3 to 5, respectively. FIG. 3 is a vertical cross-sectional view showing the schematic configuration of the burner tube according to a comparative embodiment. FIG. 4 is a partially enlarged view of the configuration shown in FIG. 3. FIG. 4 schematically shows a thermal deformation amount of a first wall section 06 in the radial direction by a dashed line with regard to a virtual case (case 1) where the first wall section 06 receives no constraint of thermal deformation from partition wall sections 010, and schematically shows a thermal deformation amount of the first wall section 06 in the radial direction by a single-dotted chain line with regard to an actual case (case 2) where the first wall section 06 receives the constraint of thermal deformation from the partition wall sections 010.

As shown in FIG. 3, in a device for performing heat exchange, in the first wall section 06 located between the high-temperature fluid and the cooling medium (a low-temperature fluid having a lower temperature than the high-temperature fluid), a temperature gradient (a temperature gradient with a temperature distribution ranging from a temperature $T_2$ to a temperature $T_1$ shown in FIG. 3) is generated in the thickness direction of the first wall section 06, and thermal deformation is caused by a temperature increase due to a heat flux q from the high-temperature fluid. Meanwhile, the partition wall sections 010, respectively, partitioning channel cross-sections 012 of a cooling channel 014 are interposed between the cooling media, the temperature of the partition wall sections 010 is the same as that of the cooling media.

As shown in FIG. 4, the first wall section 06 is not connected to the partition wall section 010 at the position P2, directly receiving no constraint of thermal deformation from the partition wall section 010 at the position P2, whereas the first wall section 06 is connected to the partition wall section 010 at the position P1, directly receiving the constraint of thermal deformation from the partition wall section 010 at the position P1. Thus, a large thermal stress is caused at the position P1 and in the vicinity thereof in the first wall section 06, which may cause damage.

By contrast, in the burner tube 5 (5A) shown in FIG. 2, as described above, the first wall section 6 includes the thin portion 16 having the thickness t2 smaller than the thickness t1 at the position P2 away from the partition wall section 10 in the axial direction. Thus, compared with the respective configurations shown in FIGS. 3 and 4, the temperature of the first wall section 6 at the position P2 decreases, making it possible to reduce the thermal deformation amount of the first wall section 6 at the position P2 and in the vicinity thereof. Thus, it is possible to reduce the thermal stress caused at the position P1 and in the vicinity thereof in the first wall section 6, and to suppress the damage to the first wall section 6.

Figure 5:
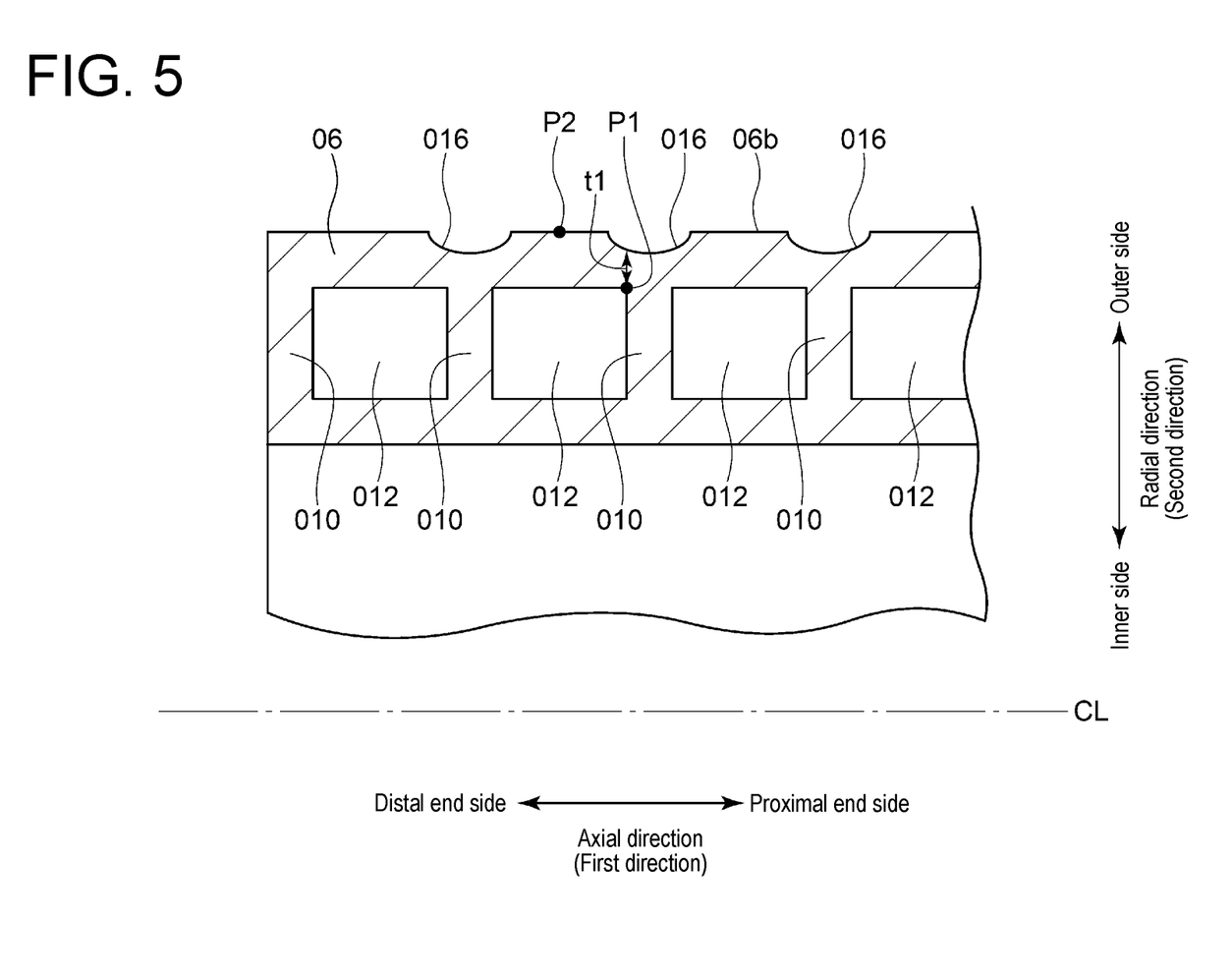
FIG. 5 is a vertical cross-sectional view showing the schematic configuration of the burner tube according to another comparative embodiment.

As shown in FIG. 5, in a case where each of thin portions 016 is disposed at a position at which a corresponding one of the partition wall sections 010 exists in the axial direction (in a case where an outer peripheral surface 06b of the first wall section 06 is formed into a concave shape at the axial position at which the corresponding one of the partition wall sections 010 exists), the temperature of the first wall section 06 at the position P2 is unchanged from the cases of the configurations of FIGS. 3 and 4, respectively, and thus the thermal deformation amount of the first wall section 06 at the position P2 is also unchanged from the respective cases shown in FIGS. 3 and 4. Rather, the thickness t1 of the first wall section 06 at a corner of the channel cross-section 012 decreases, resulting in concentration of the thermal stress at the position P1 and in the vicinity thereof, and an increase in thermal stress at the position P1 and in the vicinity thereof.

By contrast, in the configuration shown in FIG. 2, since the thin portion 16 is formed at a position away from the position P1 in the axial direction (an axial range without the position P1), it is possible to effectively reduce the thermal stress of the first wall section 6 at the position P1. Further, in the configuration shown in FIG. 2, as described above, since the thin portion 16 has the thickness t2 smaller than the above-described thickness t1 at the position P2 where the axial distances from the two partition wall sections 10 of the plurality of partition wall sections 10 adjacent to each other are equal, it is possible to effectively reduce the thermal stress of the first wall section 6 at the position P1 by effectively suppressing the concentration of the thermal stress into the position P1.

Next, some other embodiments will be described. In other embodiments to be described below, unless otherwise stated, common reference characters with those for the respective constituent components in the aforementioned embodiments denote the same constituent components as those for the respective constituent components in the aforementioned embodiments, and the description thereof will be omitted.

Figure 6:
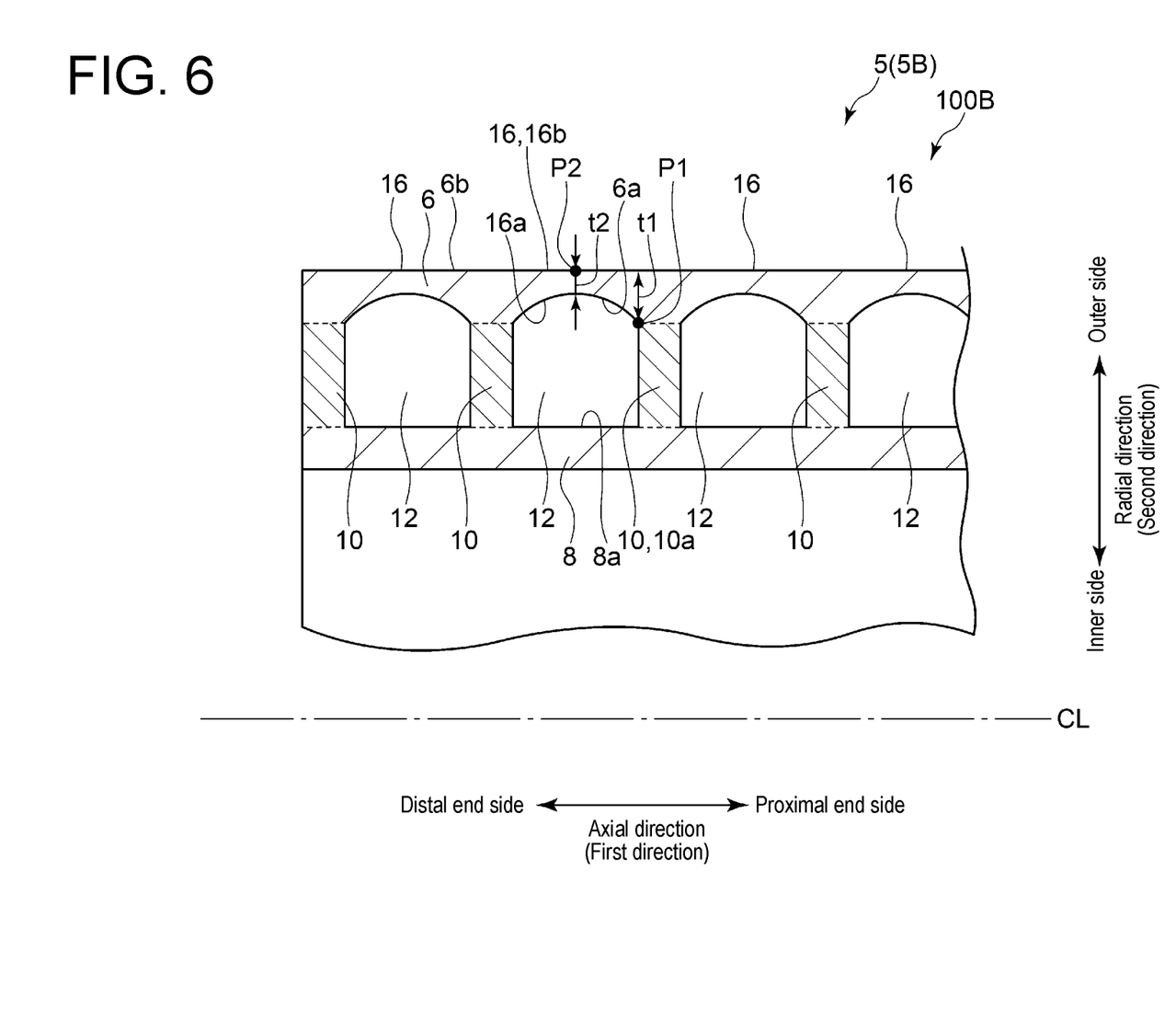
FIG. 6 is a vertical cross-sectional view showing the schematic configuration of a burner tube 5 (5B) according to another embodiment, and shows a cross-section including the center axis CL (the cross-section including the axial direction and the radial direction) of the burner tube 5 (5B).

FIG. 6 is a vertical cross-sectional view showing the schematic configuration of a burner tube 5 (5B) according to another embodiment, and shows a cross-section including the center axis CL (the cross-section including the axial direction and the radial direction) of the burner tube 5 (5B). In the burner tube 5 (5A) shown in FIGS. 2 and 3, the surface 16b of the thin portion 16 on the side opposite to the second wall section 8 is formed into the concave shape, whereas in the burner tube 5 (5B) shown in FIG. 6, the surface 16a of the thin portion 16 on the side of the second wall section 8 (the inner peripheral surface of the thin portion 16) is formed into a concave shape. In the cross-section shown in FIG. 6, the surface 16a of the thin portion 16 on the side of the second wall section 8 is formed into the concave shape so as to smoothly curve from one of the two partition wall sections 10 adjacent to each other to the other.

In the configuration shown in FIG. 6, the first wall section 6, the second wall section 8, and the plurality of partition wall sections 10 constitute a cooling channel structure 100B forming the cooling channel 14. That is, the cooling channel 14, through which the cooling medium for cooling the burner tube 5 (5B) flows, is formed in the inner portion of the burner tube 5 (5B) itself (the thick inner portion of the burner tube 5), and the burner tube 5 (5B) itself constitutes the cooling channel structure 100B.

In the cross-section shown in FIG. 6 as well, letting t1 be the thickness of the first wall section 6 at the position Pb where the surface 6a of the first wall section 6 on the side of the second wall section 8 and the front surface 10a of the partition wall section 10 are connected, the first wall section 6 includes the thin portion 16 having the thickness t2 smaller than the thickness t1 at the position P2 away from the partition wall section 10 in the axial direction. Thus, compared with the respective configurations shown in FIGS. 3 and 4, it is possible to suppress the temperature increase of the first wall section 6 at the position P2, and to reduce the thermal deformation amount of the first wall section 6 at the position P2. Thus, it is possible to reduce the thermal stress caused at the position P1 and in the vicinity thereof in the first wall section 6, and to suppress the damage to the first wall section 6.

Further, the thin portion 16 has the thickness t2 smaller than the above-described thickness t1 at the position P2, where the axial distances from the two partition wall sections 10 of the plurality of partition wall sections 10 adjacent to each other are equal, and the thin portion 16 has the minimum thickness at the above-described position P2. With the above configuration, it is possible to effectively reduce the thermal stress at the position P1 of the first wall section 6 by effectively suppressing the concentration of the thermal stress into the position P1.

Figure 7:
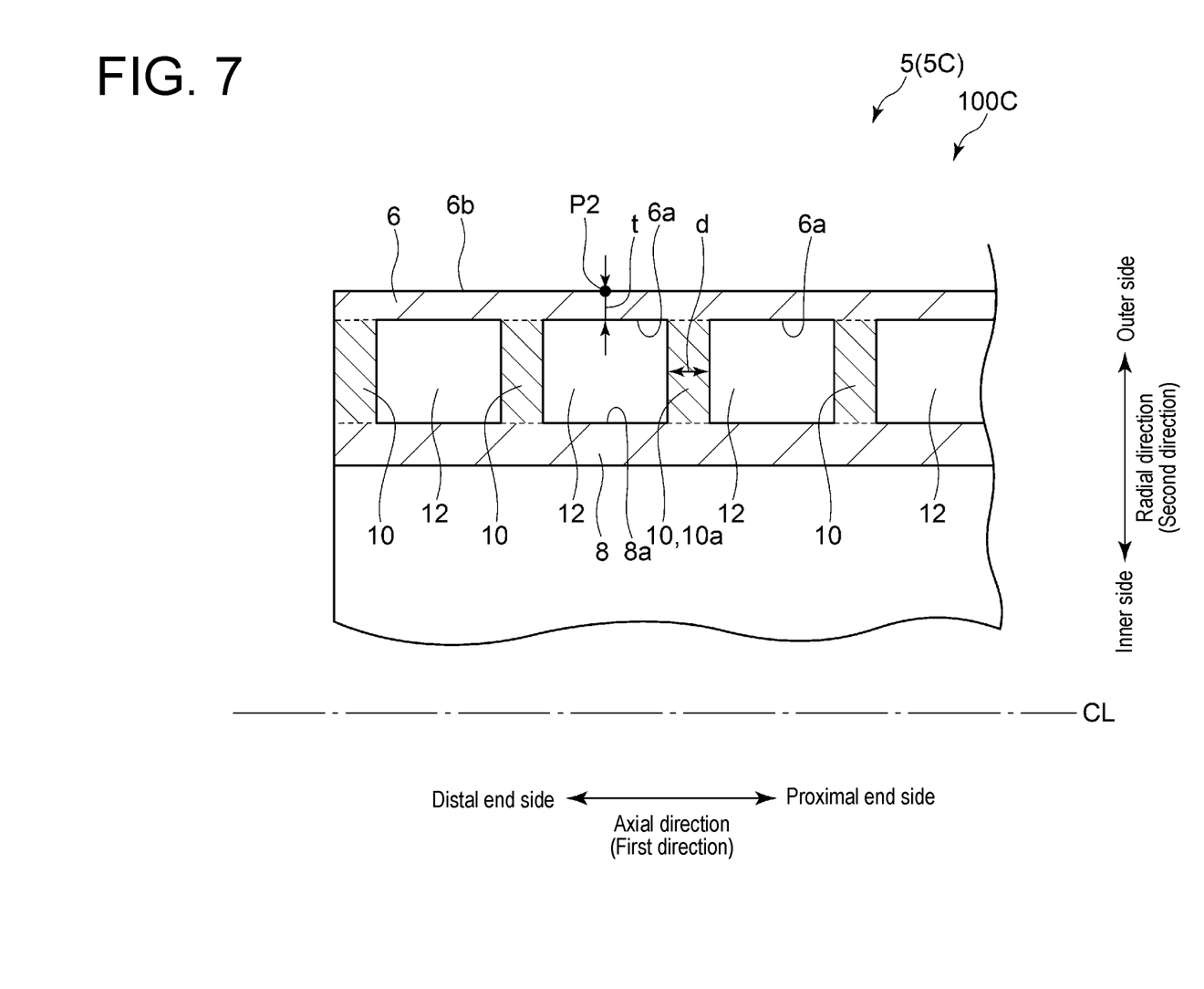
FIG. 7 is a vertical cross-sectional view showing the schematic configuration of a burner tube 5 (5C) according to another embodiment, and shows a cross-section including the center axis CL (the cross-section including the axial direction and the radial direction) of the burner tube 5 (5C).

FIG. 7 is a vertical cross-sectional view showing the schematic configuration of a burner tube 5 (5C) according to another embodiment, and shows a cross-section including the center axis CL (the cross-section including the axial direction and the radial direction) of the burner tube 5 (5C).

In some embodiments, for example, as shown in FIG. 7, a thickness t of the first wall section 6 may be smaller than a thickness d of the partition wall section 10. In the exemplary form shown in FIG. 7, the first wall section 6 has the uniform thickness t regardless of the axial position, and the partition wall section 10 has the uniform thickness regardless of the radial position.

In the configuration shown in FIG. 7, the first wall section 6, the second wall section 8, and the plurality of partition wall sections 10 constitute a cooling channel structure 100C forming the cooling channel 14. That is, the cooling channel 14, through which the cooling medium for cooling the burner tube 5 (5C) flows, is formed in the inner portion of the burner tube 5 (5C) itself (the thick inner portion of the burner tube 5), and the burner tube 5 (5C) itself constitutes the cooling channel structure 100C.

In the configuration shown in FIG. 7 as well, compared with the respective configurations shown in FIGS. 3 and 4, by decreasing the thickness t of the first wall section 6, it is possible to suppress the temperature increase of the first wall section 6 at the position P2, and to reduce the thermal deformation amount of the first wall section 6 at the position P2. Thus, it is possible to reduce the thermal stress caused at the position P1 and in the vicinity thereof in the first wall section 6, and to suppress the damage to the first wall section 6.

According to the studies by the present inventors, comparing the thermal stress caused at the position P1 among the respective configurations shown in FIGS. 2, 3, 6, and 7, the configuration shown in FIG. 2 can have the minimum thermal stress at the position P1 and can obtain a most favorable result. Further, the configuration shown in FIG. 7 can have the minimum thermal stress at the position P1 next to the configuration shown in FIG. 2, and can obtain the second most favorable result. Furthermore, the configuration shown in FIG. 6 can have the minimum thermal stress at the position P1 next to the configuration shown in FIG. 7, and can obtain the third most favorable result. In particular, in the configuration shown in FIG. 2, since the surface 6b of the first wall section 6 on the side opposite to the second wall section 8 is formed into the concave shape in each thin portion 16, it is possible to decrease the temperature at the position P2 relative to the respective cases shown in FIGS. 6 and 7 by reducing the heat flux passing through the position P2. Thus, it is considered that the thermal stress at the position P1 can be reduced more effectively.

The present disclosure is not limited to the above-described embodiments, and also includes an embodiment obtained by modifying the above-described embodiments and an embodiment obtained by combining these embodiments as appropriate.

For example, in some embodiments described above, the cases where the burner tubes 5 (5A to 5E) constitute the cooling channel structures, respectively, have been exemplified. The same cooling channel structure as the above cooling channel structures may be applied to a nozzle skirt of a rocket engine.

Figure 8:
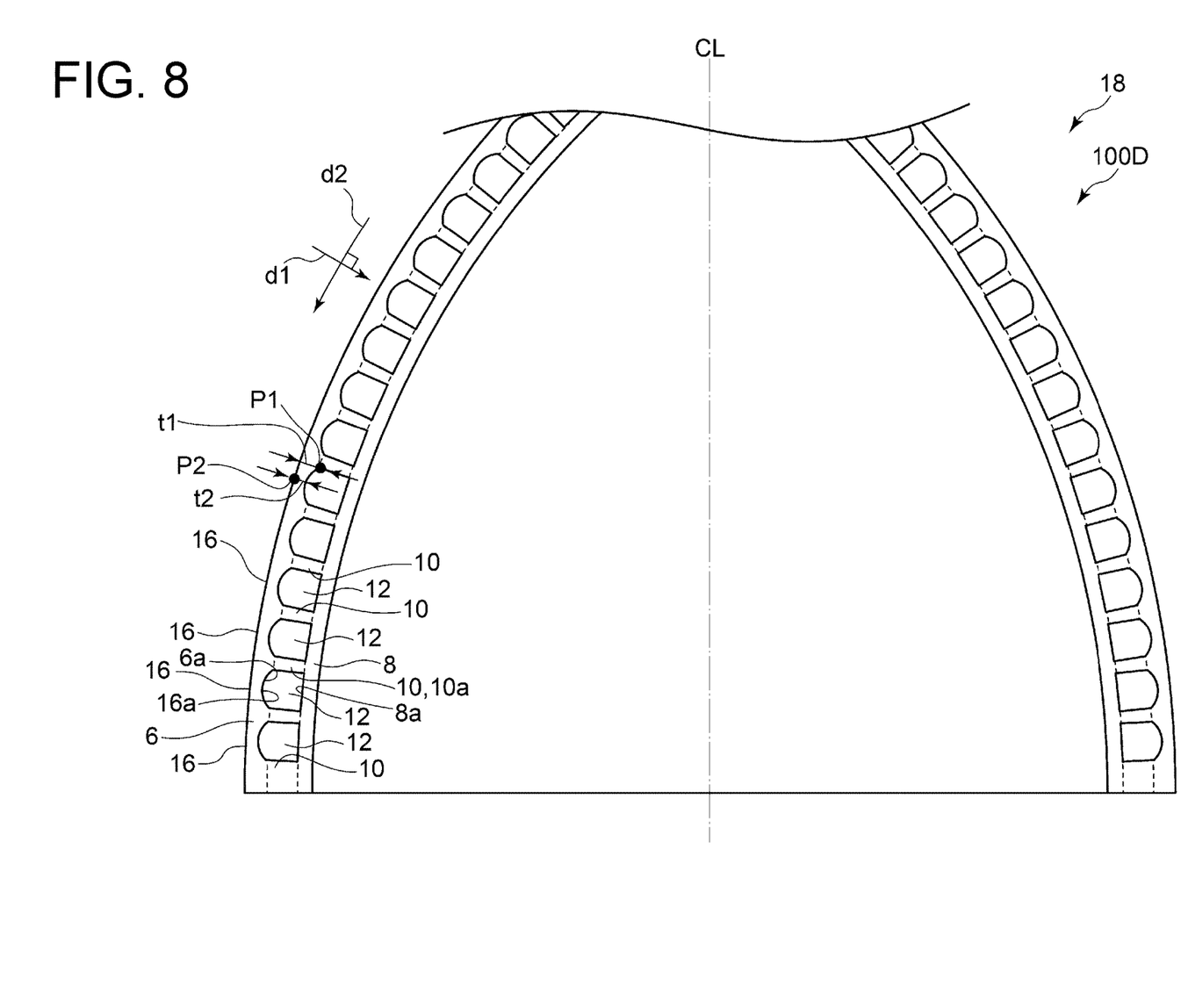
FIG. 8 is a partial cross-sectional view showing the schematic configuration of a nozzle skirt 18 of a rocket engine according to another embodiment.

FIG. 8 is a partial cross-sectional view showing the schematic configuration of a nozzle skirt 18 of a rocket engine according to another embodiment.

The nozzle skirt 18 of the rocket engine shown in FIG. 8 is formed into a tubular shape and includes the tubular first wall section 6 extending along a first direction d1, the tubular second wall section 8 disposed at the interval from the first wall section 6 in a second direction d2 (a thickness direction of the nozzle skirt 50) orthogonal to the first direction d1, and the plurality of partition wall sections 10 connecting the first wall section 6 and the second wall section 8. The tubular second wall section 8 is disposed on the inner peripheral side of the tubular first wall section 6, and the center axis CL of the first wall section 6 coincides with the center axis CL of the second wall section 8. The radius of the tubular first wall section 6 and the radius of the tubular second wall section 8 increase toward the distal end side (the lower side of the drawing) of the nozzle skirt 18.

The plurality of partition wall sections 10 connect the first wall section 6 and the second wall section 8 so as to form the at least one cooling channel 14, which has the plurality of channel cross-sections 12 disposed at intervals in the first direction d1, between the first wall section 6 and the second wall section 8.

In the cross-section shown in FIG. 8, letting t1 be the thickness of the first wall section 6 at the position P1 where the surface 6a of the first wall section 6 on the side of the second wall section 8 and the front surface 10a of the partition wall section 10 are connected, the first wall section 6 includes the thin portion 16 having the thickness t2 smaller than the thickness t1 at the position P2 away from the partition wall section 10 in the axial direction.

In the configuration shown in FIG. 8, the first wall section 6, the second wall section 8, and the plurality of partition wall sections 10 constitute a cooling channel structure 100D forming the at least one cooling channel 14. That is, the cooling channel 14, through which the cooling medium for cooling the nozzle skirt 18 flows, is formed in the inner portion of the nozzle skirt 18 itself (the thick inner portion of the nozzle skirt 18), and the nozzle skirt 18 itself constitutes the cooling channel structure 100D.

In the above configuration as well, the temperature of the first wall section 6 at the position P2 decreases, making it possible to reduce the thermal deformation amount of the first wall section 6 at the position P2. Thus, it is possible to reduce the thermal stress caused at the position P1 and in the vicinity thereof in the first wall section 6, and to suppress the damage to the first wall section 6.

Figure 9:
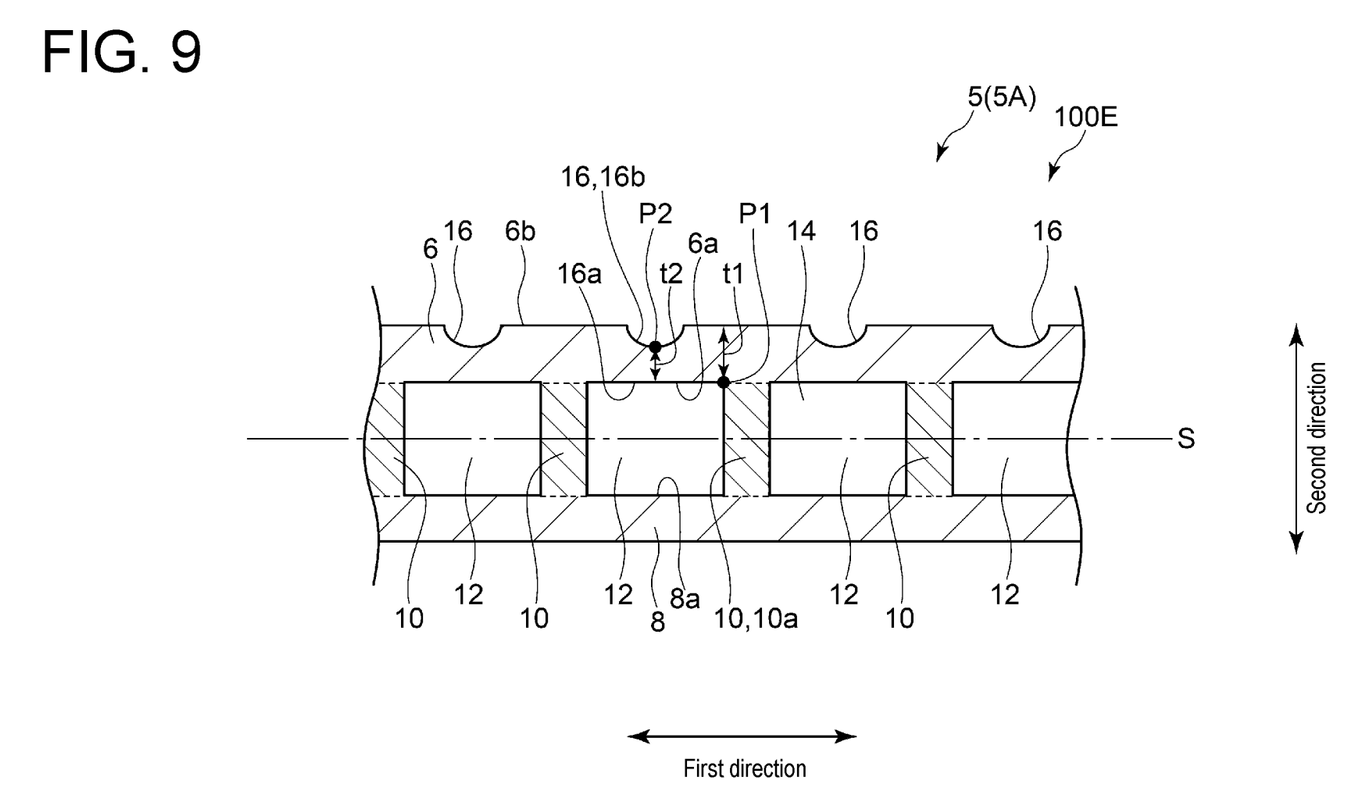
FIG. 9 is a partial cross-sectional view of the schematic configuration of a cooling channel structure according to another embodiment.

Further, in some embodiments described above, the cases where the tubular members constitute the cooling channel structures 100A to 100D, respectively, have been exemplified. That is, the cases where the first wall section 6 and the second wall section 8 are each formed into the tubular shape have been exemplified. However, in other embodiments, for example, as shown in FIG. 9, the first wall section 6 and the second wall section 8 may each be formed along a plane S. In this case, in the cross-section shown in FIG. 9, letting t1 be the thickness of the first wall section 6 at the position P1 where the surface 6a of the first wall section 6 on the side of the second wall section 8 and the front surface 10a of the partition wall section 10 are connected, the first wall section 6 includes the thin portion 16 having the thickness t2 smaller than the thickness t1 at the position P2 away from the partition wall section 10 in the first direction along the plane S.

In the configuration shown in FIG. 9, the first wall section 6, the second wall section 8, and the plurality of partition wall sections 10 constitute a cooling channel structure 100E including the at least one cooling channel 14. The cooling channel structure 10E shown in FIG. 9 is applicable to, for example, a water wall of a boiler furnace or the like. With the configuration shown in FIG. 9, it is possible to reduce the thermal stress caused at the position P1 and in the vicinity thereof in the first wall section 6, and to suppress the damage to the first wall section 6.

Further, in some embodiments described above, the configuration has been exemplified in which the first wall section 6 and the second wall section 8 are arranged in parallel. However, the first wall section 6 and the second wall section 8 may not necessarily be arranged in parallel.

The contents described in the above embodiments would be understood as follows, for instance.

(1) A cooling channel structure (such as the above-described cooling channel structures 100A to 100E) according to the present disclosure includes a first wall section (such as the above-described first wall section 6) extending along a first direction (such as the above-described axial direction or first direction d1), a second wall section (such as the above-described second wall section 8) disposed at an interval from the first wall section in a second direction (such as the above-described radial direction or second direction d2) orthogonal to the first direction, at least one cooling channel (such as the above-described at least one cooling channel 14) which has a plurality of channel cross-sections (such as the above-described plurality of channel cross-sections 12) disposed at intervals in the first direction, the cooling channel being formed between the first wall section and the second wall section, and a plurality of partition wall sections (such as the above-described plurality of partition wall sections 10) disposed in the cooling channel, connecting the first wall section and the second wall section, and forming a wall surface of the cooling channel. In a cross-section including the first direction and the second direction, letting t1 be a thickness of the first wall section at a position (such as the above-described position P1) where a surface (such as the above-described surface 6a) of the first wall section on a side of the second wall section and a front surface (such as the above-described front surface 10a) of each of the partition wall sections are connected, the first wall section includes a thin portion (such as the above-described thin portion 16) having a thickness smaller than the thickness t1 at a position (such as the above-described position P2) away from each of the partition wall sections in the first direction.

With the cooling channel structure according to the above configuration (1), since the first wall section includes the thin portion having the thickness smaller than the thickness t1 at the position away from each of the partition wall sections in the axial direction, as compared with a case where the first wall section has the uniform thickness t1, the temperature of the first wall section in the thin portion decreases, making it possible to reduce the thermal deformation amount of the first wall section in the thin portion. Thus, it is possible to reduce the thermal stress caused at the position, where the surface of the first wall section on the side of the second wall section and the front surface of each of the partition wall sections are connected, and to suppress the damage to the first wall section.

(2) In some embodiments, in the cooling channel structure according to the above configuration (1), the thin portion has a thickness smaller than the above-described thickness t1 at a position (such as the above-described position P2) where distances in the first direction from two partition wall sections of the plurality of partition wall sections adjacent to each other are equal.

With the cooling channel structure according to the above configuration (2), it is possible to effectively reduce the thermal stress at the position, where the surface of the first wall section on the side of the second wall section and the front surface of each of the partition wall sections are connected, by effectively suppressing the concentration of the thermal stress into the concerned position.

(3) In some embodiments, in the cooling channel structure according to the above configuration (1) or (2), a surface (such as the above-described surface 16b) of the thin portion on a side opposite to the second wall section is formed into a concave shape.

With the cooling channel structure according to the above configuration (3), since the surface of the thin portion on the side opposite to the second wall section is formed into the concave shape, it is possible to decrease the temperature of the thin portion as compared with a case where the surface of the thin portion on the side of the second wall section is formed into the concave shape. Thus, it is possible to effectively reduce the stress at the position where the surface of the first wall section on the side of the second wall section and the front surface of each of the partition wall sections are connected.

(4) In some embodiments, in the cooling channel structure according to any one of the above configurations (1) to (3), a surface (such as the above-described surface 16a) of the thin portion on the side of the second wall section is formed into a concave shape.

With the cooling channel structure according to the above configuration (4), it is possible to reduce the thermal stress caused at the position, where the surface of the first wall section on the side of the second wall section and the front surface of each of the partition wall sections are connected, and to suppress the damage to the first wall section. Further, the surface of the first wall section on the side opposite to the second wall section need not be formed into the concave shape.

(5) In some embodiments, in the cooling channel structure according to any one of the above configurations (1) to (4), the first wall section and the second wall section are each formed into a tubular shape with the first direction being an axial direction, and the second wall section is disposed on an inner peripheral side of the first wall section.

The cooling channel structure according to the above configuration (5) is applicable to, for example, a burner tube for guiding air serving as an oxidant for combusting fuel. In this case, the burner tube can be used for, for example, a gasification furnace for a coal gasification device or the like, a conventional boiler, an incinerator, a gas turbine combustor, or an engine.

(6) In some embodiments, in the cooling channel structure according to any one of the above configurations (1) to (4), the first wall section and the second wall section are each formed along a plane (such as the above-described plane S) including the first direction.

The cooling channel structure according to the above configuration (6) is applicable to, for example, a water wall of a boiler furnace or the like.

(7) A cooling channel structure according to the present disclosure includes a first wall section (such as the above-described first wall section 6) extending along a first direction (such as the above-described axial direction or first direction d1), a second wall section (such as the above-described second wall section 8) disposed at an interval from the first wall section in a second direction (such as the above-described radial direction or second direction d2) orthogonal to the first direction, and a plurality of partition wall sections (such as the above-described plurality of partition wall sections 10) connecting the first wall section and the second wall section so as to form at least one cooling channel (such as the above-described at least one cooling channel 14) between the first wall section and the second wall section, the cooling channel having a plurality of channel cross-sections (such as the above-described plurality of channel cross-sections 12) disposed at intervals in the first direction. The first wall section has a thickness (such as the above-described thickness t) smaller than a thickness (such as the above-described thickness d) of each of the partition wall sections.

With the cooling channel structure according to the above configuration (7), since the thickness of the first wall section is small, the temperature increase of the first wall section is suppressed by enhancing a cooling effect on the first wall section with the cooling medium flowing through the cooling channel. Thereby, it is possible to reduce the thermal deformation amount of the first wall section. Thus, it is possible to reduce the thermal stress caused at the position, where the surface of the first wall section on the side of the second wall section and the front surface of each of the partition wall sections are connected, and to suppress the damage to the first wall section.

(8) A burner according to the present disclosure includes the cooling channel structure according to any one of the above configurations (1) to (7).

Since the burner according to the above configuration (8) includes the cooling channel structure according to any one of the above configurations (1) to (7), it is possible to reduce the thermal stress caused at the position, where the surface of the first wall section on the side of the second wall section and the front surface of each of the partition wall sections are connected, and to suppress the damage to the first wall section. Thus, it is possible to suppress damage to the burner.

(9) A heat exchanger according to the present disclosure includes the cooling channel structure according to any one of the above configurations (1) to (7).

Since the heat exchanger according to the above configuration (9) includes the cooling channel structure according to any one of the above configurations (1) to (7), it is possible to reduce the thermal stress caused at the position, where the surface of the first wall section on the side of the second wall section and the front surface of each of the partition wall sections are connected, and to suppress the damage to the first wall section. Thus, it is possible to suppress damage to the heat exchanger.

REFERENCE SIGNS LIST

2 Burner
4 Fuel nozzle
5 (5A-5E) Burner tube
6 First wall section
8 Second wall section
10 Partition wall section
12 Channel cross-section
14 Cooling channel
16 Thin portion
18 Nozzle skirt
26 Combustion chamber
28 Wall
30 Swirler
100A-100E Cooling channel structure

The invention claimed is:

1. A cooling channel structure, comprising:
a first wall section extending along a first direction;
a second wall section disposed at an interval from the first wall section in a second direction orthogonal to the first direction;
at least one cooling channel which has a plurality of channel cross-sections disposed at intervals in the first direction in a cross-section which includes the first direction and the second direction, the at least one cooling channel being formed between the first wall section and the second wall section; and
a plurality of partition wall sections disposed in the at least one cooling channel, connecting the first wall section and the second wall section, and forming a wall surface of the at least one cooling channel,
wherein the first wall section, the second wall section and the partition wall sections are integrally formed by additive manufacturing, and
wherein, in the cross-section including the first direction and the second direction, letting t1 be a thickness of the first wall section at a position where a surface of the first wall section which faces the second wall section and a front surface of each of the partition wall sections are connected, the first wall section includes a thin portion having a thickness that is smaller than the thickness t1, the thin portion being at a position away from each of the partition wall sections in the first direction.

2. The cooling channel structure according to claim 1, wherein the thin portion having the thickness that is smaller than the thickness t1 is arranged between two adjacent partition wall portions of the plurality of partition wall sections relative to the first direction, and at a position where respective distances along the first direction between the thin portion and each of the two adjacent partition wall sections are equal to each other.

3. A cooling channel structure, comprising:
a first wall section extending along a first direction;
a second wall section disposed at an interval from the first wall section in a second direction orthogonal to the first direction;
at least one cooling channel which has a plurality of channel cross-sections disposed at intervals in the first direction in a cross-section which includes the first direction and the second direction, the at least one cooling channel being formed between the first wall section and the second wall section; and
a plurality of partition wall sections disposed in the at least one cooling channel, connecting the first wall section and the second wall section, and forming a wall surface of the at least one cooling channel,
wherein, in the cross-section including the first direction and the second direction, letting t1 be a thickness of the first wall section at a position where a surface of the first wall section which faces the second wall section and a front surface of each of the partition wall sections are connected, the first wall section includes a thin portion having a thickness that is smaller than the thickness t1, the thin portion being at a position away from each of the partition wall sections in the first direction, and
wherein a surface of the thin portion on a side which faces away from the second wall section is formed into a concave shape.

4. The cooling channel structure according to claim 1, wherein a surface of the thin portion which faces the second wall section is formed into a concave shape.

5. The cooling channel structure according to claim 1, wherein the first wall section and the second wall section are each formed into a tubular shape with the first direction being an axial direction, and
wherein the second wall section is disposed on an inner peripheral side of the first wall section.

6. The cooling channel structure according to claim 1, wherein the first wall section and the second wall section are each formed along a plane including the first direction.

7. A cooling channel structure, comprising:
a first wall section extending along a first direction;
a second wall section disposed at an interval from the first wall section in a second direction orthogonal to the first direction; and
a plurality of partition wall sections connecting the first wall section and the second wall section so as to form at least one cooling channel between the first wall section and the second wall section, the at least one cooling channel having a plurality of channel cross-sections disposed at intervals in the first direction in a cross-section which includes the first direction and the second direction,
wherein the first wall section has a thickness smaller than a thickness of each of the partition wall sections.

8. A burner comprising the cooling channel structure according to claim 1.

9. A heat exchanger comprising the cooling channel structure according to claim 1.

10. A burner comprising the cooling channel structure according to claim 3.

11. A heat exchanger comprising the cooling channel structure according to claim 3.

12. A burner comprising the cooling channel structure according to claim 7.

13. A heat exchanger comprising the cooling channel structure according to claim 7.

* * * * *